United States Patent [19]

Tsutsumitake

[11] Patent Number: 5,161,224
[45] Date of Patent: Nov. 3, 1992

[54] LIST TYPE DATA STORING AND RETRIEVING SYSTEM

[75] Inventor: Hideyuki Tsutsumitake, Yokohama, Japan

[73] Assignee: Kabushiki Kaisha Toshiba, Kawasaki, Japan

[21] Appl. No.: 353,549

[22] Filed: May 18, 1989

[30] Foreign Application Priority Data

May 20, 1988 [JP] Japan ................ 63-123524

[51] Int. Cl.⁵ .......................................... G06F 15/40
[52] U.S. Cl. .................................. 395/600; 395/64;
364/DIG. 1; 364/282.1; 364/283.1; 364/283.2; 364/274; 364/275
[58] Field of Search ... 364/200 MS File, 900 MS File; 395/600, 64, 700

[56] References Cited

U.S. PATENT DOCUMENTS 4,554,631 11/1985 Reddington ............... 364/200
4,817,036 3/1989 Millett et al. ............. 364/900

OTHER PUBLICATIONS

Artificial Intelligence Programming, Chap. 14. "Discrimination Nets with Variables"; Charniac et al.; 1980.

Primary Examiner—David L. Clark
Assistant Examiner—Paul Kulik
Attorney, Agent, or Firm—Oblon, Spivak, McClelland, Maier & Neustadt

[57] ABSTRACT

A list type data storing and retrieving system includes an analyzing circuit for analyzing a structure of list type data and outputting symbols constituting the data and appearance position data of each symbol in each list type data, a storage circuit for storing the position data output from the analyzing circuit, symbols respectively assigned to the position data, and at least one identifier set for the symbols assigned to the position data to specify the input list type data, and a retrieval circuit for reading out sets of identifiers including the same symbols and position data as symbols constituting list type data to be input and retrieved and corresponding position data or identifiers including variable symbols in position data having a higher order than that of the position data from the storage means with respect to all symbols constituting the input list type data, and outputting list type data specified by identifiers common to all the symbols as unifiable candidates.

12 Claims, 7 Drawing Sheets

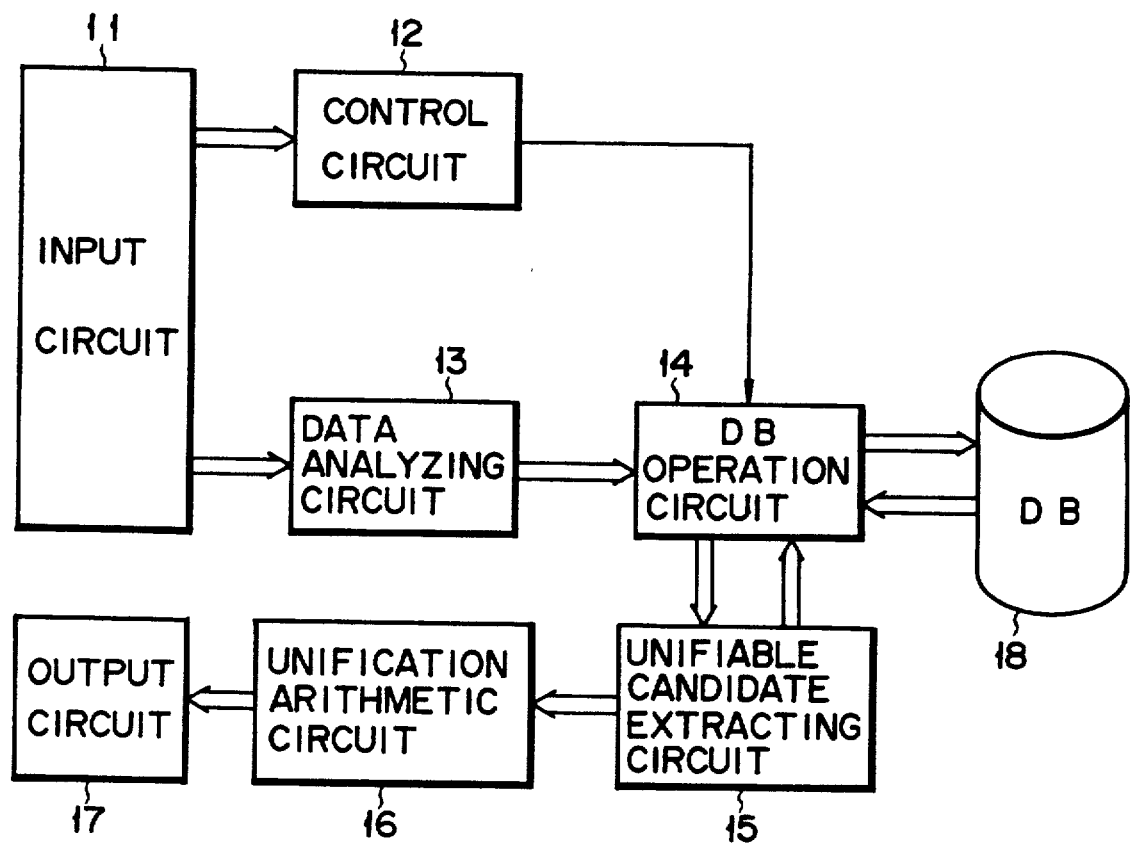
F I G. 4
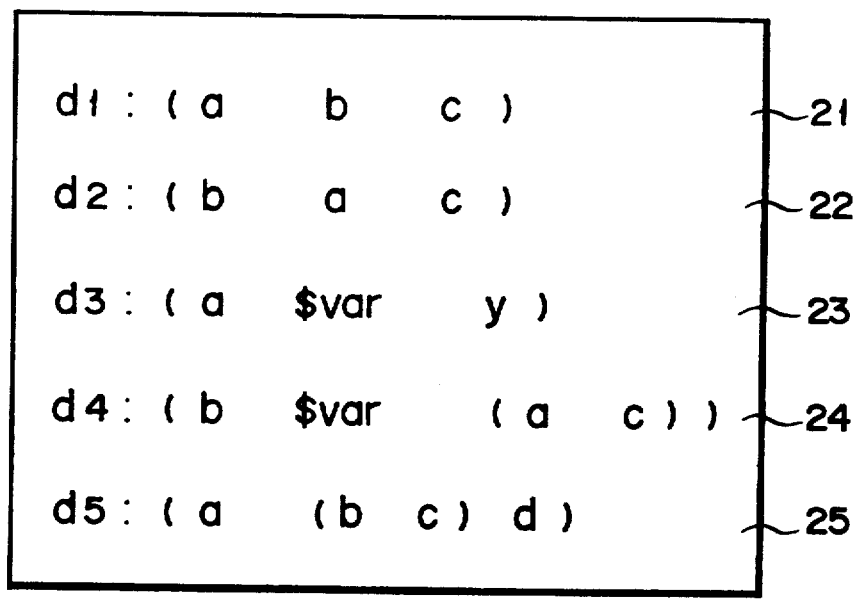
F I G. 5

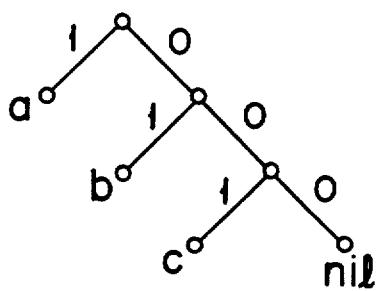
(d1)
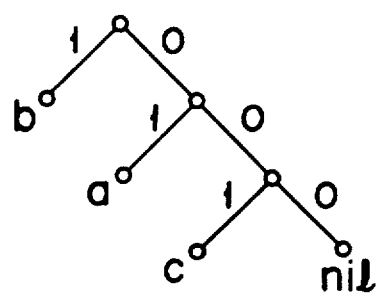
(d2)
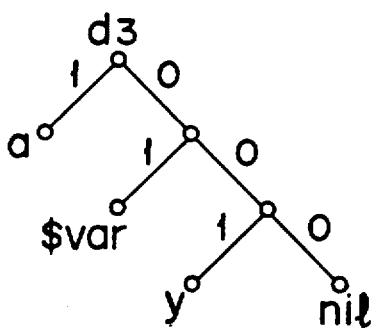
(d3)
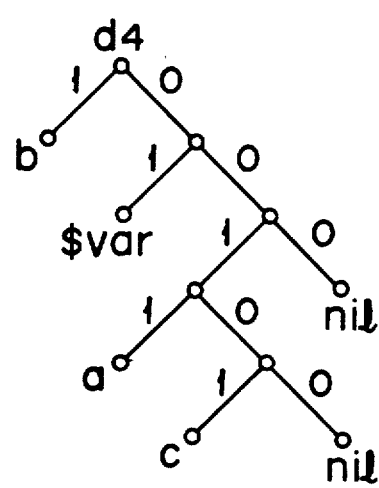
(d4)
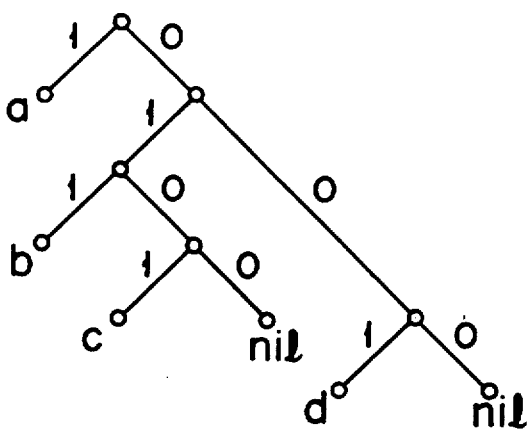
(d5)
F I G. 6

LIST TYPE DATA STORING AND RETRIEVING SYSTEM

BACKGROUND OF THE INVENTION

1. Field of the Invention

The present invention relates to a list type data storing and retrieving system for storing and retrieving list type data using a LISP language or the like.

2. Description of the Related Art

List type data using the LISP language or the like is used as a basic unit for notation of information especially in the field of artificial intelligence. List type data are respectively constituted by sets 11 to 15 each obtained by aligning a certain number of elements and putting them in parentheses, as shown in FIG. 1. In this list type data, symbols a and b represent constants and a symbol affixed with "?" represents a variable.

If a large amount of list type data described above is present, it takes a considerably long period of time to retrieve list type data to be retrieved and unifiable lists. For this reason, in a conventional system, candidates of unifiable list type data are retrieved prior to execution of unification. A system using discrimination nets is known as a system for selecting unifiable list type data candidates. In this system, the list type data shown in FIG. 1 is converted into list type data shown in FIG. 2, and elements in the list are sequentially discriminated from the first element. As a result, a tree structure shown in FIG. 3 is generated, and retrieval is performed by searching this tree structure. Such a tree structure is described in a literature—Charniak, Riesbeck, McDermott "ARTIFICIAL INTELLIGENCE PROGRAMMING"—entitled "Discrimination Nets With Variable".

According to the above-described tree structure, when a variable (element with "?") appears in the latter half of list type data, since list type data candidates are sequentially narrowed down, high-speed retrieval can be performed. However, if a variable is present in the first half of list type data, since all the nets of the tree structure must be retrieved, the retrieval efficiency is greatly degraded. More specifically, assume that list type data (a b ?p) is to be retrieved. This data is converted into data (#a #b #variable nil) as shown in FIG. 2, and this list type data is retrieved from a discrimination net of the tree structure shown in FIG. 3. The above data can be retrieved through the discrimination net of a path P1.

If list type data to be retrieved has a format (?p ?q c), a converted list (#variable #variable #c nil) is generated. Since a variable is present in the first half of the list, all paths P1 to P5 of the tree structure must be retrieved. Therefore, a time required for retrieval is greatly prolonged.

In the above-described discrimation system using a tree structure, a considerably long period of time is required for retrieval depending on the position of a variable appearing in list type data.

SUMMARY OF THE INVENTION

It is an object of the present invention to provide a list type data storing and retrieving system which can perform high-speed retrieval regardless of the position of a variable appearing in list type data.

According to the present invention, there is provided a list type data storing and retrieving system comprising an analyzing circuit for analyzing a structure of list type data and outputting symbols constituting the data and appearance position data of each symbol in each list type data, a storage circuit for storing the position data output from the analyzing circuit, symbols respectively assigned to the position data, and at least one identifier set for the symbols assigned to the position data, and a retrieval circuit for reading out sets of identifiers including the same symbols and position data as symbols constituting list type data to be input and retrieved and corresponding position data or identifiers including variable symbols in position data having a higher order than that of the position data from the storage circuit with respect to all symbols constituting each list type data, and outputting list type data specified by identifiers common to all the symbols as unifiable candidates.

BRIEF DESCRIPTION OF THE DRAWINGS

FIG. 4 is a block diagram showing a circuit arrangement of a list type data storing and retrieving system according to an embodiment of the present invention;

FIG. 5 is a view showing an arrangement of list type data based on the present invention;

FIG. 6 is a view showing tree structures based on various types of list type data;

DETAILED DESCRIPTION OF THE PREFERRED EMBODIMENTS

Figure 1:
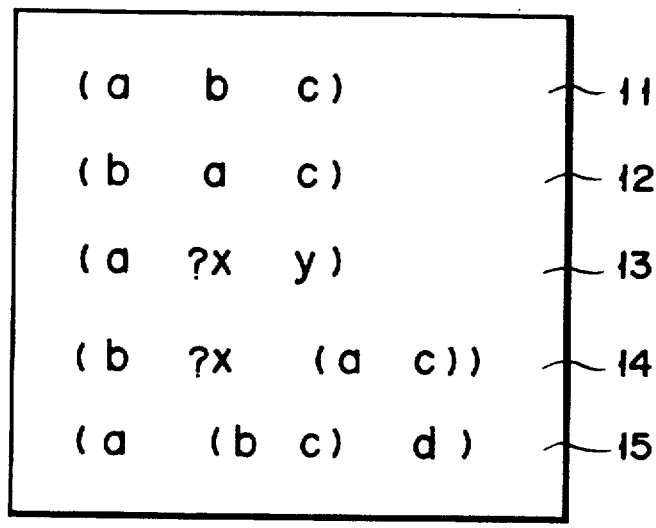
FIG. 1 is a view showing an arrangement of list type data used for a conventional list type data retrieval system.
Figure 2:
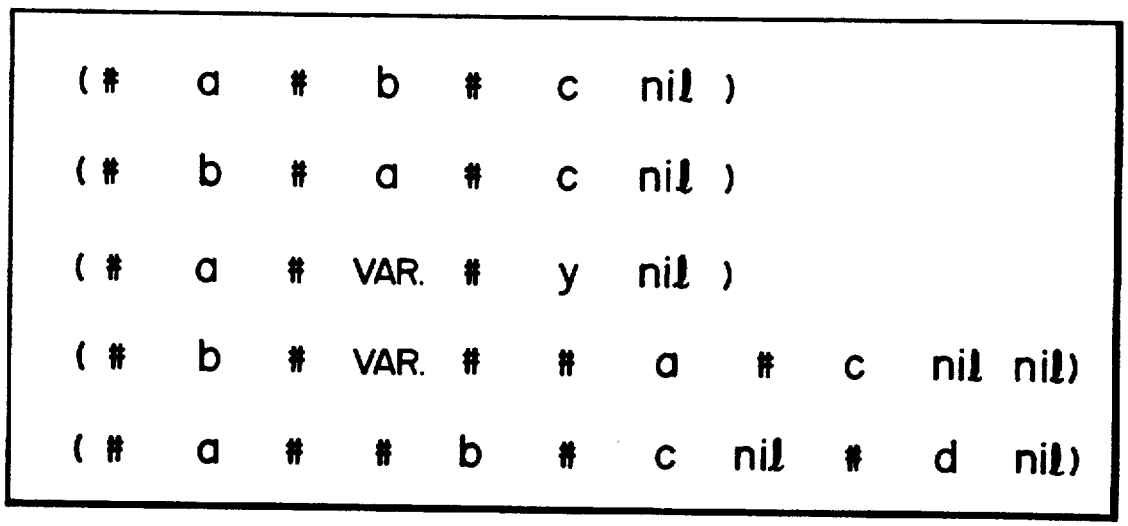
FIG. 2 is a view showing converted list type data of the list type data in FIG. 1.
Figure 3:
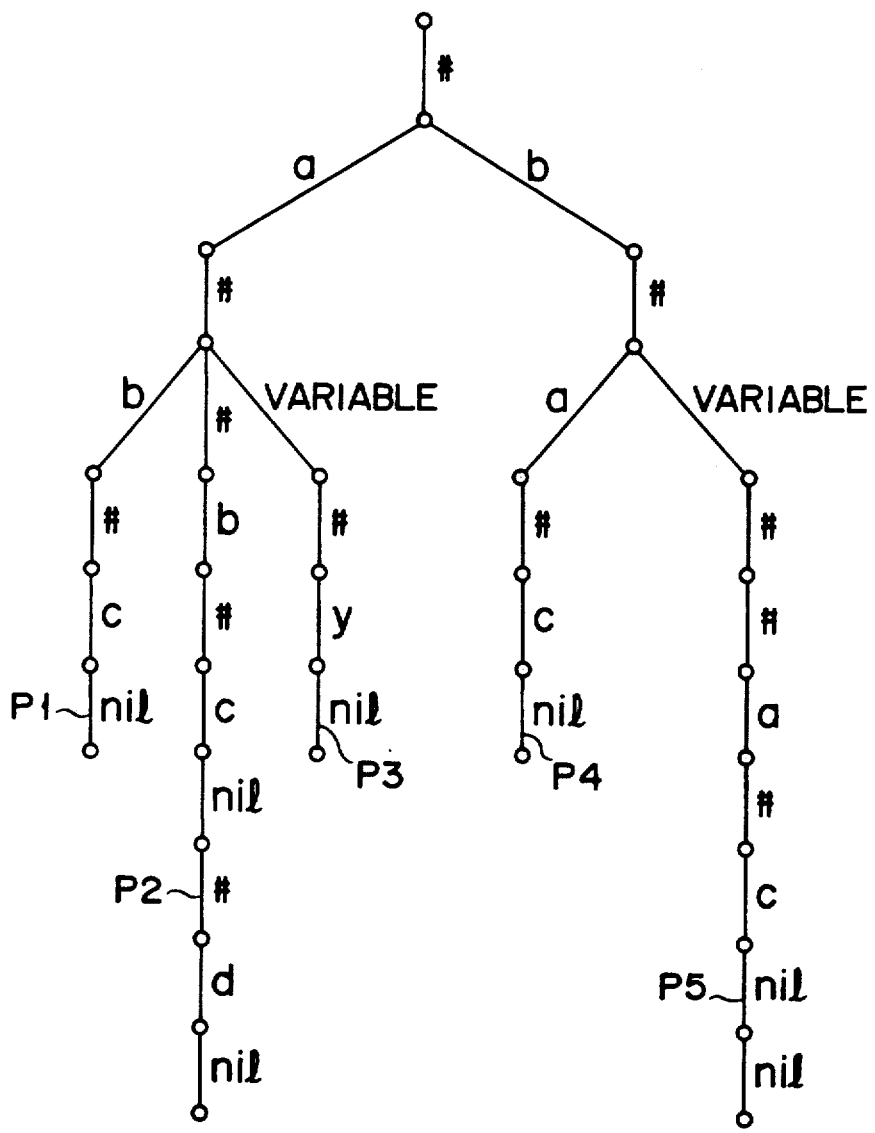
FIG. 3 is a view showing a tree structure based on the converted list type data in FIG. 2.

An arrangement of a list type data storing and retrieving system according to the present invention will be described below by exemplifying a circuit shown in FIG. 4.

An input unit 11 is used to input list type data, an insert command, a delete command, and a retrieval command. The input unit 11 is connected to a control circuit 12 and a data analyzing circuit 13. The control circuit 12 determines whether to insert list type data supplied from the input unit 11 in existing data and to delete or retrieve it therefrom, and outputs an insert, delete, or retrieval command to a data base operation circuit 14. The data analyzing circuit 13 analyzes the structure of input list type data and outputs the symbols constituting the list type data and the position data of the respective symbols to the data base operation circuit 14.

The operation circuit 14 is constituted by, e.g., a CPU, converts data supplied from the data analyzing circuit 13 into an internal notation form including position data as an major element, stores it in a data base 18, and directly controls the data base 18 to execute a command from the control circuit 12. In addition, the operation circuit 14 is connected to a unifiable candidate extracting circuit 15 so as to control data exchange for execution of unification during retrieval.

The unifiable candidate extracting circuit 15 has a function of extracting input data and unifiable candidate data from the data base 18 through the operation circuit 14 in a retrieval mode. The output terminal of the extracting circuit 15 is connected to a unification arithmetic circuit 16. The arithmetic circuit 16 performs an arithmetic operation of candidate data and input data on the basis of a unificational algorithm to set the unification of both the data. The output terminal of the arithmetic circuit 16 is connected to an output circuit 17 so as to output the unification set data thereto.

The data base 18 stores list type data in accordance with an internal notation form shown in FIG. 5. Referring to FIG. 5, list type data 21 to 25 respectively correspond the data shown in FIG. 1, and a symbol $var corresponds to a variable, for example, ?x in FIG. 1. Identifiers d1, d2, d3, d4, and d5 are respectively added to the data 21 to 25. These identifiers d1 to d5 are respectively expressed by tree structures shown in FIG. 6. In each tree structure, a path descending leftward represents the level of a symbol, and a path descending rightward represents the position of a symbol. If "1" and "0" are respectively assigned to paths descending leftward and rightward, the position data of each symbol can be represented by representing a corresponding path extending from an end of a tree structure to its root by using a binary code string. For example, a symbol b is recognized to be located at a position "110", in the list type data corresponding to the identifier 5. That is, "110" is the position data of the symbol b with the identifier d5. Note that "1" and "0" in this case are simply used as codes, and hence position data need not be represented by numerals 1 and 0. Paths descending leftward and rightward are always arranged on the left and right sides of an end of a tree structure.

Position data (1, 10, 000, ..., 10100, ...) are stored in the data base 18 together with corresponding symbols (a, b, c, ..., nil, ...) and identifiers (d1, d2, d3, ...) in a hash table form. In this hash table, if position data "100" is recognized, it can be determined that list type data having symbols c at this position are data represented by the identifiers d1 and d2.

An operation of the above-described list type data storing and retrieving system will be described below.

Figure 9:
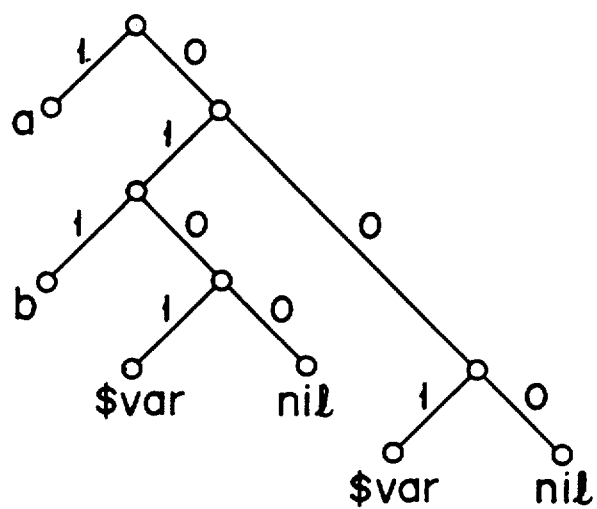
FIGS. 9 to 11 are respectively views showing tree structures based on various types of list type data.

When a retrieval command and list type data (a (b ?p) ?q) to be retrieved are input to the input unit 11, the control circuit 12 recognizes the retrieval command and supplies the retrieval command to the data base operation circuit 14. The list type data to be retrieved is analyzed by the data analyzing circuit 13. In this case, the list type data is represented by a tree structure shown in FIG. 9. The data analyzing circuit 13 analyzes the position data of the respective symbols in the following manner and outputs these position data to the operation circuit 14:

a→1 b→110 nil→0010 nit→000

Figure 8:
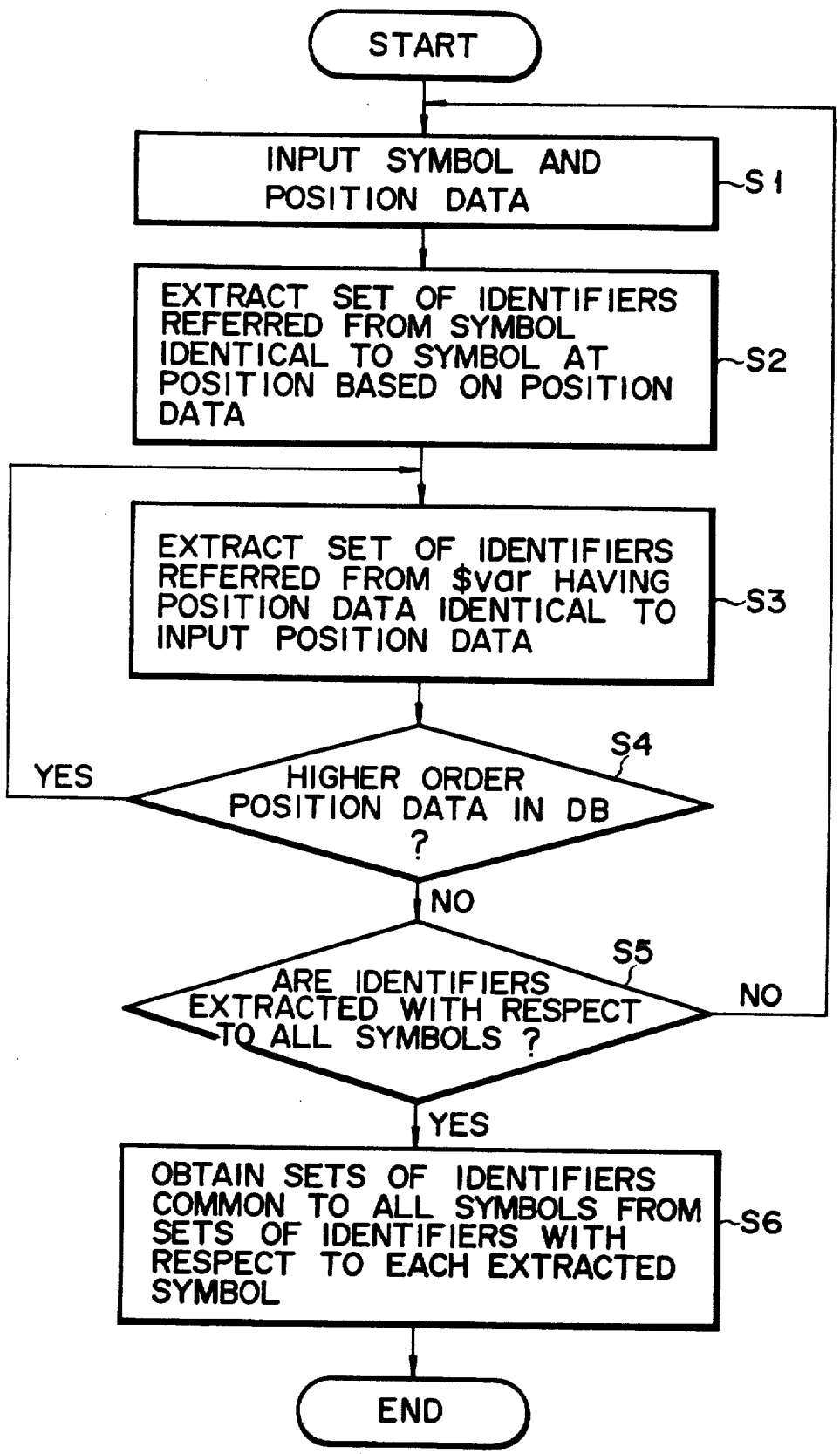
FIG. 8 is a flow chart for explaining an operation of extracting unifiable candidates.

When the data base operation circuit 14 transfers the position data to the unifiable candidate extracting circuit 15, the extracting circuit 15 selects unifiable candidates from the data base 18 through the operation circuit 14. This operation will be described below with reference to a flow chart shown in FIG. 8.

Figure 7:
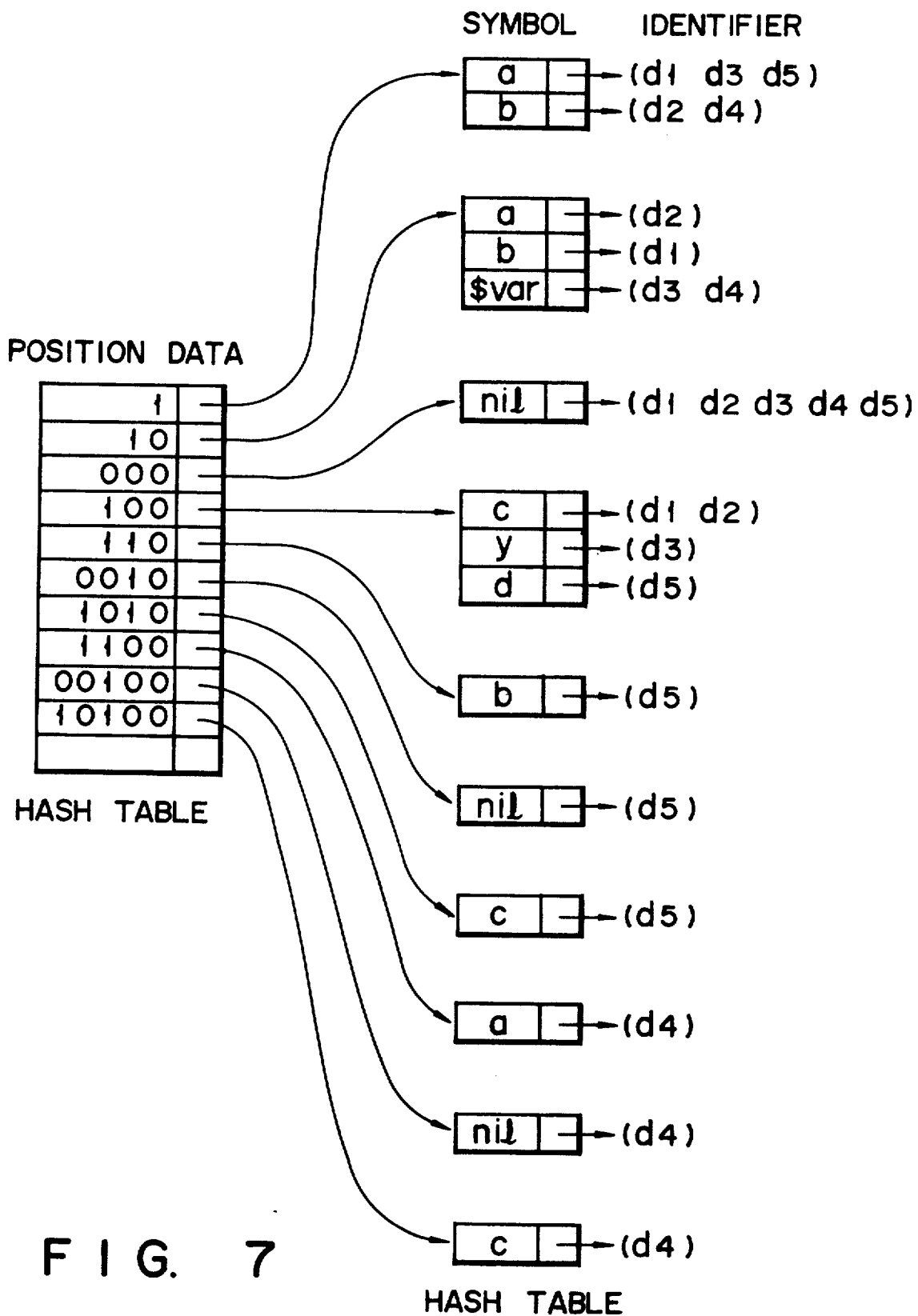
FIG. 7 is a view showing an internal notation form of list type data stored in a storage circuit.

When the unifiable candidate extracting circuit 15 receives a symbol and corresponding position data in step S1 after the start of the operation, the circuit 11 extracts a set of identifiers referred from the same position data as the input position data, e.g., 1 and the same symbols as the input symbols, e.g., a, i.e., (d1 d3 d5) from the hash table (FIG. 7) of the data base 18 in step S2. In step S3, a set of identifiers including a variable $var with respect to the symbol corresponding to the position data 1 identical to the input position data is extracted from the data base 18. Since the variable $var is not present in the position data 1, no identifier set is extracted with respect to the position data 1.

In step S4, it is checked whether higher order position data with respect to the input position data is present. In the hash table shown in FIG. 7, higher order data with respect to position data 100 are position data 00 and 0, and higher order data with respect to position data 0010 are position data 010, 10 and 0. Since no higher order position data is present with respect to the position data 1, it is checked whether identifiers are extracted with respect to all the symbols. In this case, NO is obtained, and hence the flow returns to step S1.

Subsequently, a symbol b and corresponding position data 110 are input. The identifier d5 is an identifier for the position data 110. Since no identifier corresponding to the $var is present with respect to the position data 110, the presence of $var at the position data 10 is confirmed. After the confirmation of the present $var at the higher position data 10, an identifier set (d3, d4) with respect to $var is extracted from the data base 18. Therefore, the identifiers d3, d4, and d5 are associated with the symbol b.

Similarly, identifiers with respect to the position data of nil, i.e., 0010 are extracted. An identifier corresponding to the position data 0010 and nil is the identifier d5. Since $var is not included in the position data 0010, it is checked whether $var is included in any higher position data with respect to the position data 0010. Since $var is included in the position data 10, an identifier set (d3, d4) referred from $var is extracted from the data base 18. Therefore, identifiers associated with nil are d3, d4, and d5.

Identifiers with respect to the position data of another nil, i.e., 000, are extracted. An identifier set corresponding to the position data 000 and nil is (d1, d2, d3, d4, d5).

In step S5, it is checked whether extraction of identifiers with respect to all the symbols is completed. In step S6, common identifiers are obtained according to the following logical calculating on the basis of the sets of the identifiers extracted with respect to all the symbols:

$$(d1, d3, d5) \cap (d3, d4, d5) \cap (d3, d4, d5) \cap (d1, d2, d3, d4, d5) = (d3, d5)$$

Consequently, list type data (a ?x y) and (a (b c) d) corresponding to the identifiers d3 and d5 are extracted as unifiable candidates. The unifiable candidates extracted in this manner are input to the unification arithmetic circuit 16, and unification of the unifiable candidates and the input list type data is executed. In this case, both the identifiers d3 and d5 are unifiable.

Similarly, unification of two list type data (a b ?p) and (?p ?q c) is performed.

Figure 10:
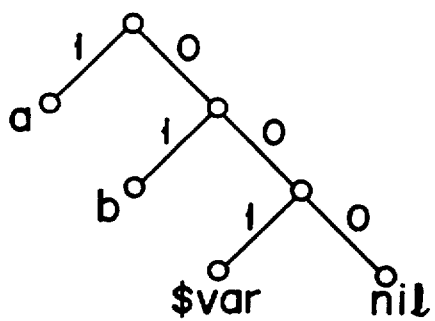

The former data is expressed in accordance with the tree structure shown in FIG. 10 as follows:

a→1 b→10 nil →000

A set of common identifiers with respect to the above tree structure data is obtained in the same manner as described above as follows:

(d1, d3, d5)∩(d1, d3, d4)∩(d1, d2, d3, d4, d5) =(d1, d3)

Consequently, list type data (a b c) and (a $var y) corresponding to (d1, d3) are extracted as unifiable candidates. The unifiable candidates extracted in this manner are input to the unifiable arithmetic circuit 16, and unification of the unifiable candidates and the input list type data is executed. Upon establishment of unification of both the data, the input list type data is unifiable with data (a b c) and (a $var y).

Figure 11:
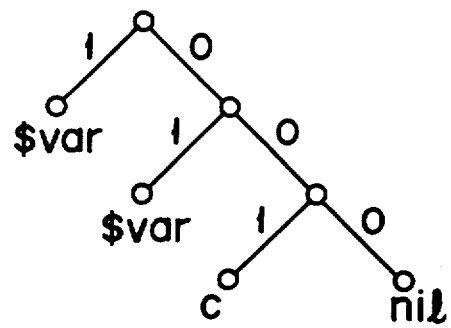

The latter data is expressed in accordance with the tree structure in FIG. 11 as follows:

c→100 nil→000

Similarly, a set of common identifiers with respect to the above tree structure data is as follows:

(d1, d3) (d1, d2, d3, d4, d5)=(d1, d2)

Consequently, list type data (a b c) and (b a c) corresponding to (d1, d2) are extracted as unifiable candidates. The unifiable candidates extracted in this manner are input to the unification arithmetic circuit 16, and unification of the unifiable candidates and input list type data is executed. Upon establishment of unification of both the data, the input data is unifiable with data (a b c) and (b a c).

As has been described above, according to the present invention, since a set of identifiers is detected on the basis of position data regardless of the positions of variables (i.e., $var and ?x) appearing in lists, retrieval of list type data can always be performed with high efficiency.

If input list type data and unifiable list type data must be deleted from the data base, this deletion can be easily performed by deleting corresponding identifiers from a hash table stored in the data base. Similarly, addition of list type data can be performed.

In the above-described embodiment, a binary code is used as the position data of each symbol. However, position data may be expressed by other notations such as a decimal notation as long as the appearance position of each symbol can be specified.

What is claimed is:

1. A list type data storing and retrieving system comprising:
   input means for inputting list type data to be retrieved;
   analyzing means for analyzing a structure of the list type data having symbols and appearance position data of each of the symbols and outputting the symbols and the appearance position data;
   storage means for storing the appearance position data output from said analyzing means, symbols respectively assigned to the appearance position data, and at least one identifier set for the symbols assigned to the appearance position data; and
   retrieval means for reading out one of a set of identifiers including the same symbols and position data as symbols and position data contained in list type data to be retrieved and a set of identifiers including variable symbols in position data having a higher order than that of the position data, from said storage means with respect to all symbols constituting the input list type data, and outputting list type data specified by identifiers common to all the symbols as unifiable candidates.

2. A system according to claim 1, wherein said storage means comprises data base storage means for storing the list type data in an internal notation from based on the position data.

3. A system according to claim 2, wherein said storage means comprises means for storing a plurality of position data each expressed by a binary notation, at least one symbol corresponding to each position data, and at least one identifier including the symbol.

4. A system according to claim 1, wherein said retrieval means comprises means for extracting identifiers referred from the same position data and symbols as the position data and symbols of the input list type data with respect to all symbols from said storage means, means for performing a logical operation of all the symbols and a plurality of corresponding identifier sets, to obtain common identifiers and output list type data corresponding to the common identifiers from said storage means as unifiable candidate data, and means for calculating the input list type data and the unifiable candidate data in accordance with a predetermined algorithm, and means for recognizing the input list type data.

5. A system according to claim 4, wherein said means for performing a logical operation comprises means for extracting an identifier corresponding to a variable added to the same position data as higher order position data of the position data of the input data from said storage means.

6. A system according to claim 4, wherein said storage means comprises means for storing a plurality of position data each expressed by a binary notation, at least one symbol corresponding to each position data, and at least one identifier including the symbol.

7. A list type data storing and retrieving system comprising:
   storage means for storing symbols, position data of the symbols, unifiable candidate list type data including symbols corresponding to the position data, and identifiers assigned to the unifiable candidate list type data,
   means for inputting list type data including a plurality of symbols and position data of the symbols;
   analyzing means for analyzing the input list type data for extracting the symbols and the position data therefrom;
   retrieval means for reading out, from said storage means, sets of identifiers including the same positioned data and symbols as position data and symbols corresponding to the input list type data which was analyzed by said analyzing means, said retrieval means including means for performing a logical operation of the identifier sets, to obtain common identifiers, and means for retrieving unifiable candidate list type data corresponding to the common identifiers;

unification calculating means for calculating the unifiable candidate list type data retrieved by said retrieval means and the input list type data in accordance with a predetermined algorithm, and recognizing the input list type data; and output means for outputting the list type data recognized by said unification calculating means.

8. A system according to claim 7, wherein said storage means comprises data base storage means for storing the list type data in an internal notation form based on the position data.

9. A system according to claim 8, wherein said storage means comprises means for storing a plurality of position data each expressed by a binary notation, at least one symbol corresponding to each position data, and at least one identifier including the symbol.

10. A system according to claim 9, wherein said storage means stores a symbol representing a variable.

11. A system according to claim 7, wherein said retrieval means comprises means for extracting an identifier corresponding to a variable added to the same position data as higher order position data of the position data of the input data from said storage means.

12. A system according to claim 7, wherein said storage means comprises means for storing a plurality of position data each expressed by a binary notation, at least one symbol corresponding to each position data, and at least one identifier including the symbol.

* * * * *